(12) United States Patent
Moheb et al.

(10) Patent No.: US 10,608,316 B2
(45) Date of Patent: Mar. 31, 2020

(54) KA-BAND ANTENNA WITH FINE AZIMUTH AND ELEVATION ADJUSTMENT

(71) Applicants: Hamid Moheb, Clemmons, NC (US); Arpita Soni, Raleigh, NC (US); Kyle Williamson, Clayton, NC (US)

(72) Inventors: Hamid Moheb, Clemmons, NC (US); Arpita Soni, Raleigh, NC (US); Kyle Williamson, Clayton, NC (US)

(73) Assignee: RAVEN ANTENNA SYSTEMS INC. DOING BUSINESS AS (D.B.A) GLOBAL SKYWARE, Smithfield, NC (US)

(*) Notice: Subject to any disclaimer, the term of this patent is extended or adjusted under 35 U.S.C. 154(b) by 124 days.

(21) Appl. No.: 15/584,919

(22) Filed: May 2, 2017

(65) Prior Publication Data

US 2017/0317398 A1 Nov. 2, 2017

Related U.S. Application Data

(60) Provisional application No. 62/330,538, filed on May 2, 2016.

(51) Int. Cl.
*H01Q 1/12* (2006.01)
*H01Q 13/00* (2006.01)
*F16M 11/10* (2006.01)
*F16M 11/20* (2006.01)
*F24S 30/425* (2018.01)

(52) U.S. Cl.
CPC ............ *H01Q 1/125* (2013.01); *F16M 11/10* (2013.01); *F16M 11/2014* (2013.01); *F24S 30/425* (2018.05); *H01Q 1/1264* (2013.01)

(58) Field of Classification Search
CPC .... F16M 11/10; F16M 11/20; F16M 11/2014; H01Q 1/12; H01Q 1/125; H01Q 1/1264; H01Q 13/00; H01Q 15/14; H01Q 19/132; H01Q 1/1228; F24J 2/54
See application file for complete search history.

(56) References Cited

U.S. PATENT DOCUMENTS

| | | | | |
|---|---|---|---|---|
| 4,799,064 A | * | 1/1989 | Nakamura | H01Q 1/125 343/761 |
| 4,819,006 A | * | 4/1989 | Whitesides | H01Q 1/125 248/278.1 |
| 5,554,998 A | * | 9/1996 | Sherwood | H01Q 1/08 343/763 |
| 6,559,806 B1 | * | 5/2003 | Watson | H01Q 1/125 343/758 |
| 7,385,564 B2 | * | 6/2008 | Zihlman | H01Q 1/125 343/878 |

(Continued)

*Primary Examiner* — Tho G Phan
(74) *Attorney, Agent, or Firm* — Murphy, Bilak & Homiller, PLLC

(57) ABSTRACT

According to an aspect, an antenna mount includes a pole canister and an assembly. The assembly includes a first bracket coupled in a fixed position to the pole canister. The assembly also includes a second bracket coupled to the first bracket at a pivot. The assembly also includes a third bracket movably coupled to the second bracket. The assembly further includes a first cam adapted to pivot the second bracket about the pivot in relation to the first bracket along a horizontal axis. The assembly also includes a second cam adapted to slide the third bracket in relation to the second bracket.

14 Claims, 20 Drawing Sheets

(56) References Cited

U.S. PATENT DOCUMENTS

| | | | | |
|---|---|---|---|---|
| 8,760,361 B2* | 6/2014 | Lewry | ............... | H01Q 1/125 |
| | | | | 343/878 |
| 8,866,695 B2* | 10/2014 | Renilson | ............ | H01Q 1/1228 |
| | | | | 248/218.4 |
| 2001/0045913 A1* | 11/2001 | Fedder | ............... | H01Q 1/125 |
| | | | | 343/882 |
| 2010/0127947 A1* | 5/2010 | Fruh | ............... | H01Q 1/1264 |
| | | | | 343/763 |

\* cited by examiner

KA-BAND ANTENNA WITH FINE AZIMUTH AND ELEVATION ADJUSTMENT

CROSS-REFERENCE TO RELATED APPLICATIONS

This application claims priority to U.S. Provisional Application No. 62/330,538, filed May 2, 2016, the contents of which are incorporated by reference in their entirety.

TECHNICAL FIELD

The present invention relates to antenna mounts for satellite antennas.

BACKGROUND

Directional antennas, such as a reflector antenna, must be closely aligned with a target signal source for optimal performance. Alignment of a reflector antenna is typically performed via an adjustable antenna mount that, with respect to a fixed mounting point, is adjustable in azimuth and elevation to orient the antenna towards the target. Azimuth refers to the pointing of the antenna in horizontal directions. Elevation refers to movement of the satellite antenna in vertical directions. Antenna mount coarse adjustments are incorporated into an antenna mount via movable connections that are fixed by tightening bolts. Fine adjustments are difficult to make in these arrangements because the targeting resolution is very low due to the free movement of the movable connection until the bolts are tightened.

Also, there is increasing competition for reflector antennas adapted for high volume consumer applications such as data, very small aperture terminal (VSAT), satellite TV and/or internet communications.

SUMMARY

The increasing competition for low cost broadband antenna solutions adapted for high volume consumer applications such as data, voice and video has focused attention on cost reductions resulting from materials, manufacturing and service efficiencies. Further reductions in required assembly operations and the total number of parts are desired. Therefore, embodiments described herein provide an apparatus that overcomes deficiencies in the prior art without sacrificing mechanical requirements such as ease of installation, accurate pointing to a satellite, and the ability to withstand any expected environmental factors such as wind and ice loading. Embodiments of the present invention provide for more cost effective manufacturing, assembly and installation of satellite antennas.

According to some embodiments, an antenna mount includes a pole canister adapted to receive a pole along a vertical axis and an assembly. The assembly includes a first bracket or bracket pair coupled in a fixed position to the pole canister and comprising a first cam mount. The assembly also includes a second bracket coupled to the first bracket or bracket pair at a pivot, a first mounting hole adapted to receive the first cam mount and a second cam mount. The assembly also includes a third bracket movably coupled to the second bracket and a second mounting hole adapted to receive the second cam mount. The assembly further includes a first cam rotatable about the first cam mount and adapted to pivot the second bracket about the pivot in relation to the first bracket or bracket pair along a horizontal axis. The assembly also includes a second cam rotatable about the second cam mount and adapted to slide the third bracket along the vertical axis in relation to the second bracket.

According to some embodiments, the antenna mount is integrated with a reflector back bracket such that the back bracket is directly coupled to the antenna mount, or directly coupled to the second and/or third brackets. The antenna mount, adjustable for azimuth and elevation, may include brackets riveted to each other, with one or more brackets that are attached to the reflector back bracket.

The antenna mount does not require a skew plate for rotation for polarization adjustment. Fine azimuth and elevation adjustment are performed via the first and second cams, respectively.

In some embodiments, a satellite antenna includes a foldable snap on transceiver bracket that movably couples to the boom arm. The boom arm and metal stamped transceiver bracket may be factory assembled. The boom arm may be recessed into the back bracket to reduce back bracket length and to allow for low cost straight tubing. The reflector and brackets may be metal stamped for lower manufacturing tests.

The satellite antenna may come from the factory as a multi-pack reflector or mount packs that include a reflector and an antenna mount with a back bracket or a back bracket separate from the rest of the antenna amount. The satellite antenna may be a universal antenna design that is transceiver agnostic. The universal antenna platform may offer both Broadband and direct-to-home (DTH) services from multiple satellites located from 2 to 20 degrees apart.

According to some embodiments, an antenna mount includes a first bracket comprising a pole canister extending from a face of the first bracket and adapted to receive a pole along a vertical axis. The antenna mount also includes a second bracket movably coupled to the first bracket at one or more pivots and adapted to pivot the second bracket in relation to the first bracket along a horizontal axis. The antenna mount further includes a back bracket movably coupled to the second bracket at a pivot and adapted to attach to a reflector, wherein the back bracket is adapted to slide or rotate along the vertical axis in relation to the second bracket.

According to some embodiments, an antenna mount includes a first bracket and a pole canister adapted to receive a pole along a vertical axis, where the pole canister further comprises one or more mounts adapted to couple the pole canister to the first bracket. The first bracket is movably coupled to the pole canister at the one or more mounts and adapted to pivot the first bracket in relation to the pole canister along a horizontal axis. The antenna mount also includes a back bracket coupled to the first bracket at one or more pivots and adapted to attach to a reflector, where the back bracket is adapted to slide or rotate along the vertical axis in relation to the first bracket.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
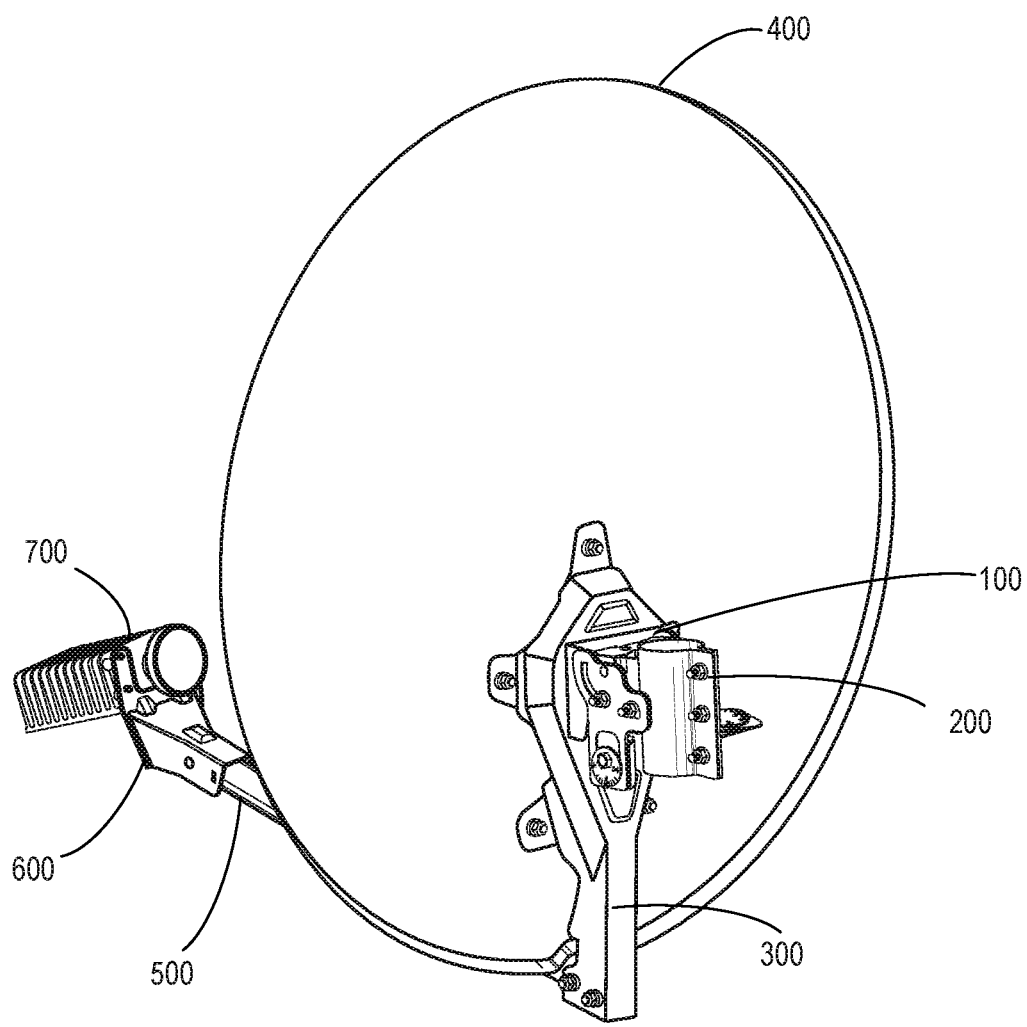
FIG. 1 is a perspective view of one embodiment of a satellite antenna.
Figure 2:
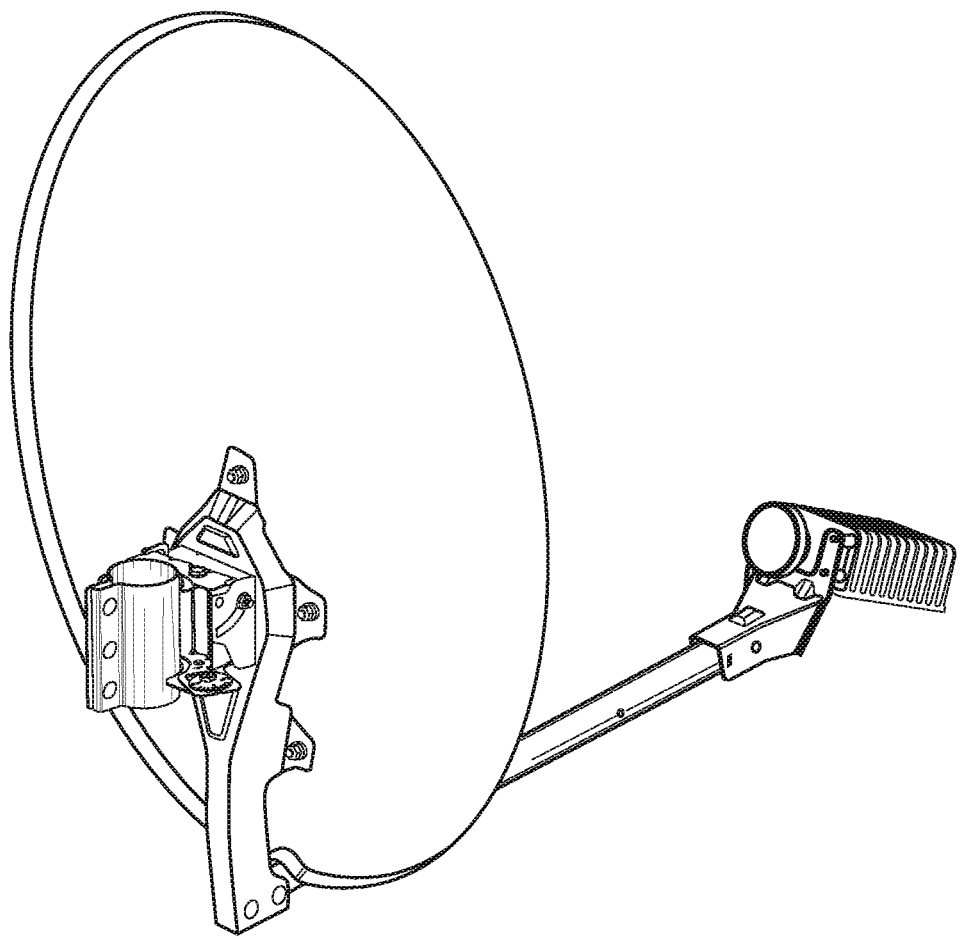
FIG. 2 is another perspective view of the embodiment of the satellite antenna.

FIG. 1 shows an embodiment of a satellite antenna. The satellite antenna includes an assembly mount 100 that attaches to a canister 200 that receives and is secured to a mounting pole. The antenna mount 100 is integrated with the back bracket 300, or attached to the back bracket 300 without any intermediate parts. The back bracket 300 is attached to a reflector 400, which may be stamped. In some embodiments, all of the major parts are stamped. The reflector 400 collects the satellite signals for a transceiver 700, which is attached to a transceiver bracket 600. The transceiver 600 is attached to a boom arm 500 that is recessed and attached to the back bracket 300. FIG. 2 is another view of the satellite antenna.

Figure 3:
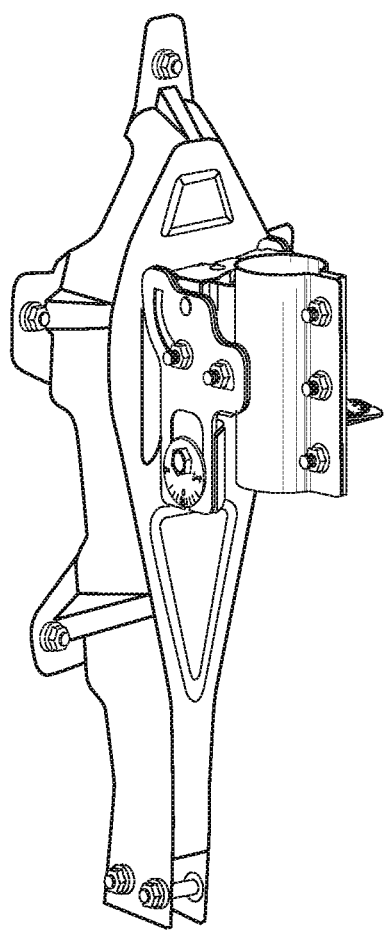
FIG. 3 is a perspective view of the embodiment showing an antenna mount integrated with a back bracket.
Figure 4:
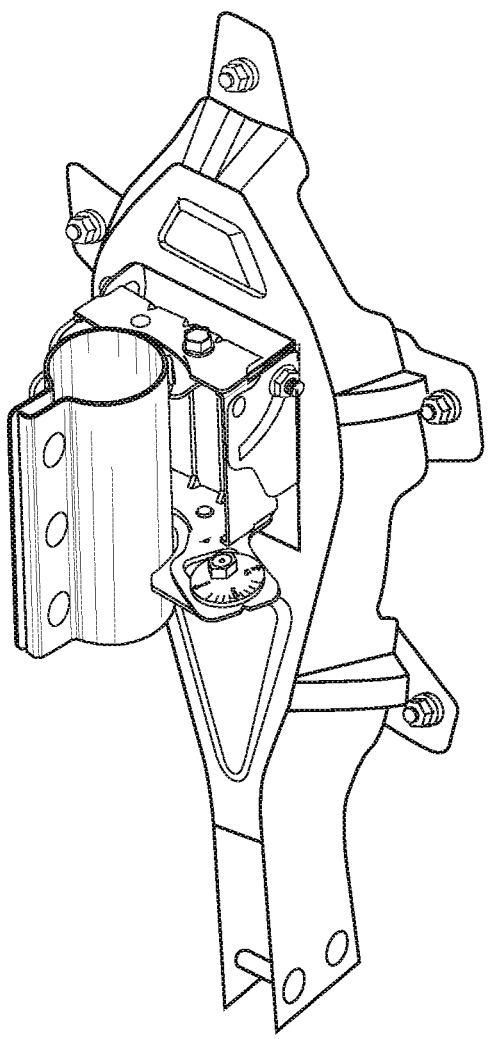
FIG. 4 is another perspective view of the embodiment showing the antenna mount integrated with the back bracket.

FIGS. 3 and 4 show the antenna mount 100 integrated with the back bracket 300. That is, the back bracket 300 is directly attached to the antenna mount 100 without a skew plate or any other intermediate hardware.

Figure 5:
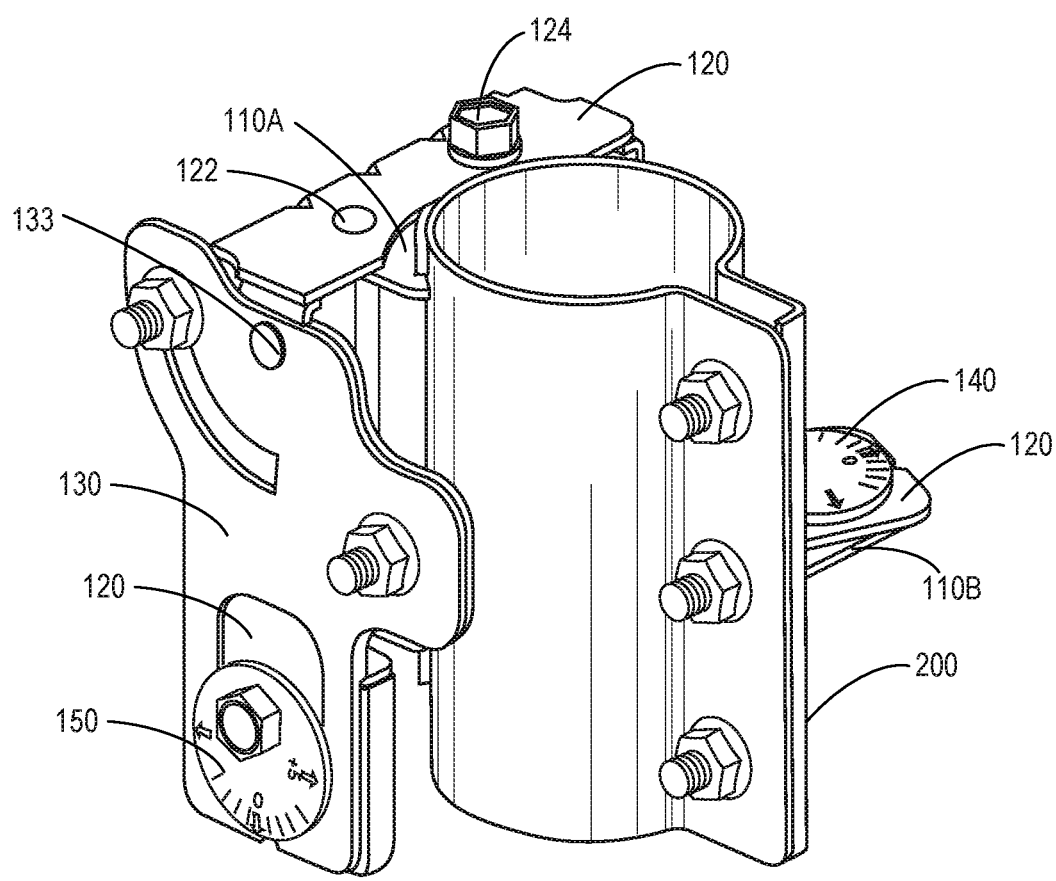
FIG. 5 is a perspective view of the embodiment showing the antenna mount.
Figure 6A:
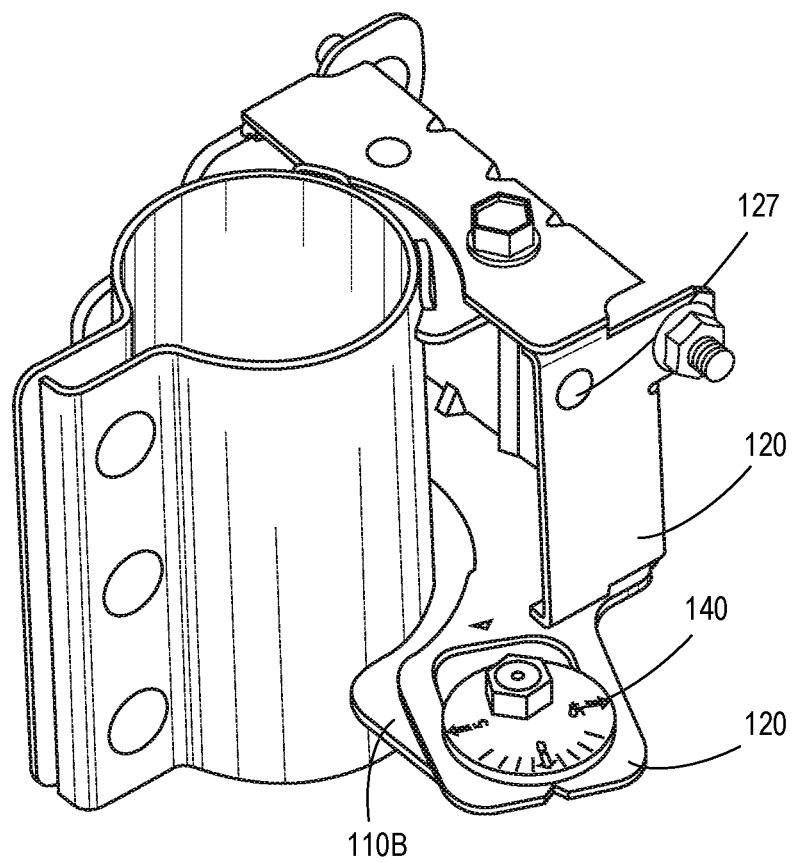
FIG. 6A is another perspective view of the embodiment showing the antenna mount.
Figure 6B:
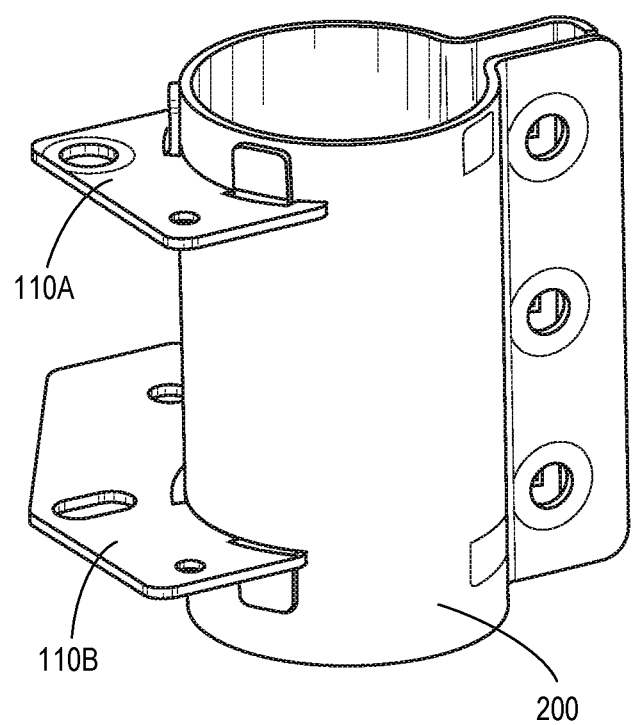
FIG. 6B shows an embodiment with a first bracket pair fixed to the canister.

FIGS. 5, 6A and 6B are perspective views of the antenna mount 100 attached to the canister 200. The antenna mount 100 is designed to provide fine azimuth and elevation adjustment, utilizing a CAM design rather than adjustment rods.

The antenna mount 100 includes an assembly with three mount portions, which are referred to as a first bracket or bracket pair 110, a second bracket 120 and a third bracket 130. Each of the brackets may be metal stamped to reduce production costs.

Figure 7A:
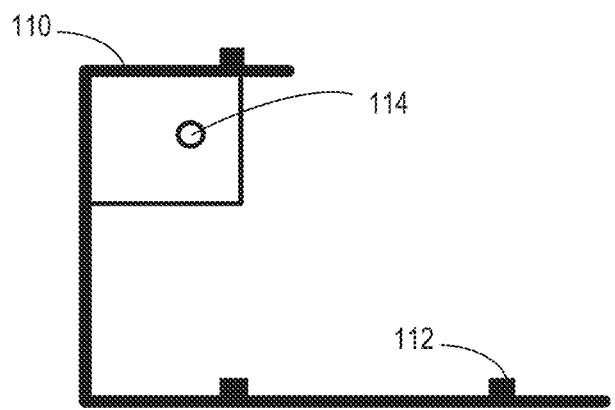
FIGS. 7A-7C are side, top and front views of a first bracket of the antenna mount, according to some embodiments.
Figure 7B:
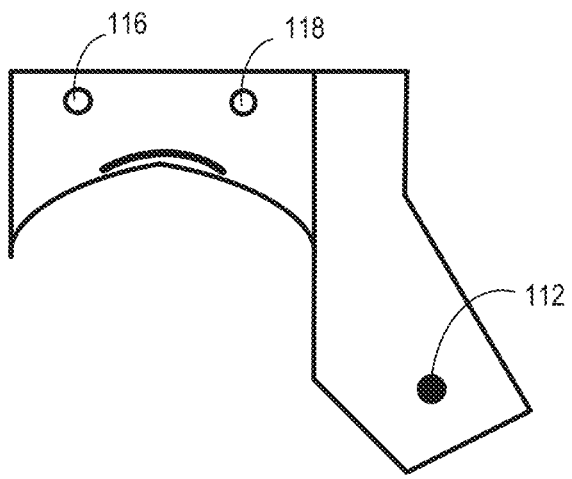
Figure 7C:
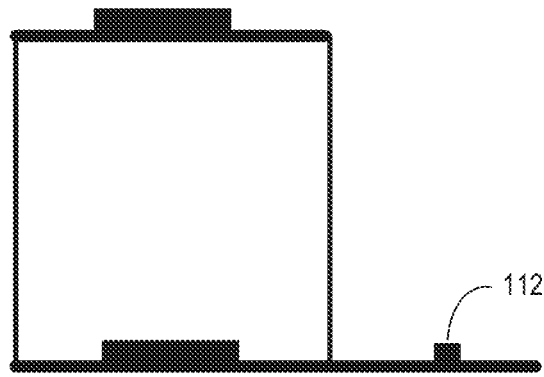
Figure 7D:
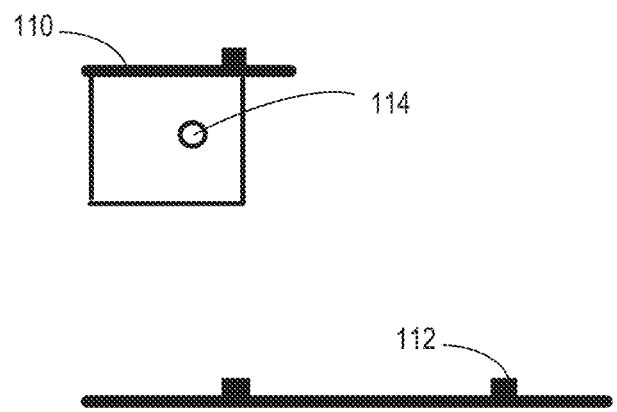
FIGS. 7D-7F are side, top and front views of a first bracket pair of the antenna mount, according to some embodiments.
Figure 7E:
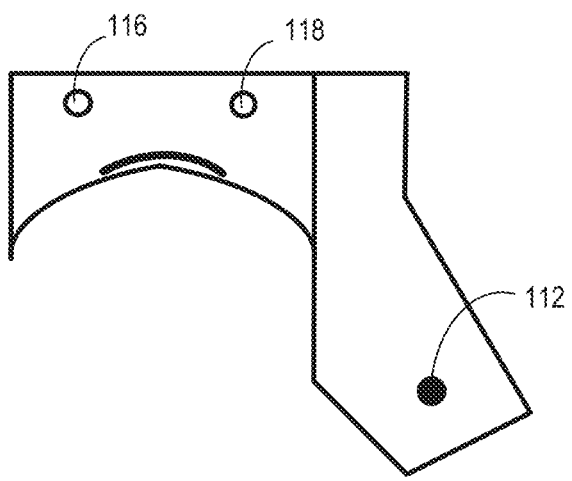
Figure 7F:
Figure 7F:

The first bracket or bracket pair 110 is attached to the canister 200. A side view of the first bracket 110 as a single piece is shown by FIG. 7A. The first bracket 110 has a first cam mount 112, which is also shown in the top view of FIG. 7B and the front view of FIG. 7C. FIGS. 7D-7F shown these same views, but of a first bracket pair 110 (as shown in FIG. 6B), where the top and bottom portions 110A and 110B of the first bracket pair are not attached to each other and are attached only to the canister 200.

The second bracket 120 is movably attached to the first bracket 110 or top and bottom portions 110A and 110B of the bracket pair 110 (as shown in FIGS. 5, 6A and 6B) by rivet(s) 122 that allows the second bracket 120 to pivot about the first bracket or bracket pair 110.

Figure 8A:
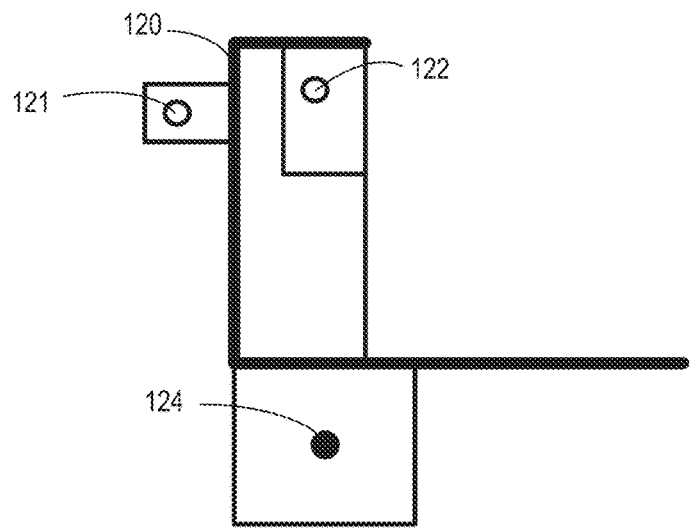
FIGS. 8A-8C are side, top and front views of a second bracket of the antenna mount, according to some embodiments.
Figure 8B:
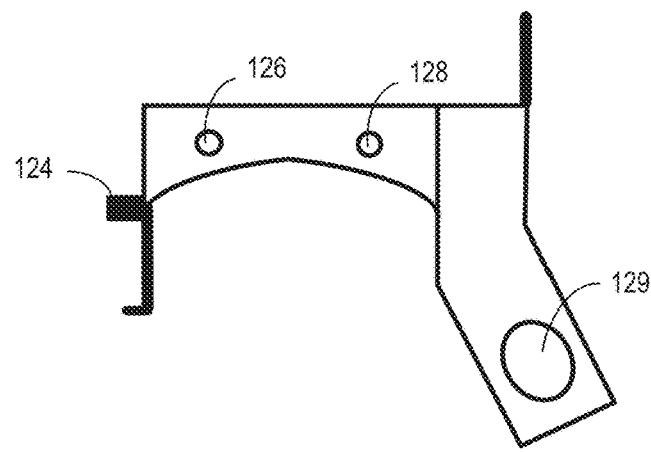
Figure 8C:
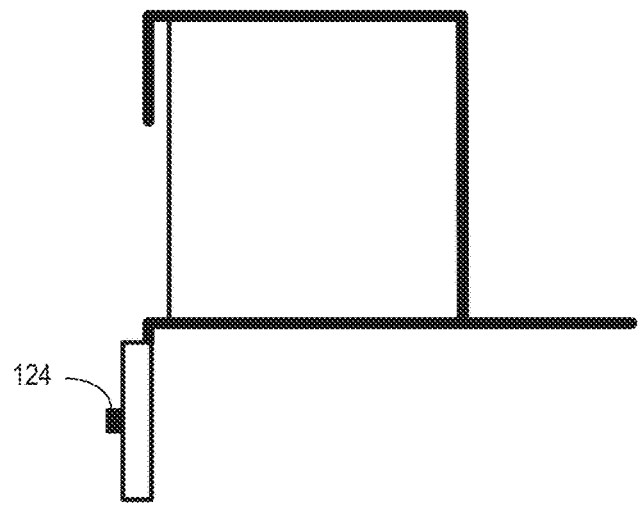

FIGS. 8A-8C show a side view, top view and front view of the second bracket 120, respectively. The pivot hole of the first bracket 110 is shown by hole 116 in FIGS. 7B and 7E, and the pivot hole of the second bracket 120 is shown by hole 126 in FIG. 8B. The opening 129 allows the first cam mount 112 to come through the second bracket 120 and to be capped by a first cam 140. The first cam 140 provides for fine azimuth tuning, which is secured in its tuned position by a nut 124 or similar component that passes through holes 118 and 128. The second bracket 120 is movably attached to the back bracket 300 or portion of a back bracket by another rivet 127. This may be through hole 114 in a plate under the right wall plate of the second bracket 120 shown in FIG. 6A. Hole 121 shows where the second bracket 120 may attach directly to the back bracket 300. In some cases, the right wall plate in FIG. 6A belongs to the third bracket 130 and is movably attached to the second bracket 120. In this case, the third bracket 130 is attached to the back bracket 300. A "hole" in these examples is not limited to enclosed holes or round holes, but may be slots or apertures with some room for movement.

Figure 9A:
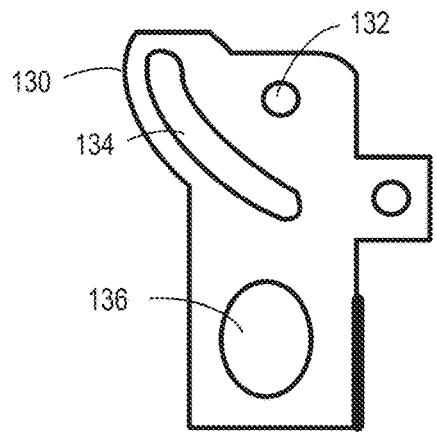
FIGS. 9A-9C are side, top and front views of a third bracket of the antenna mount, according to some embodiments.
Figure 9B:
Figure 9C:

The third bracket 130 is movably connected to the second bracket 120 by a rivet 133 through hole 132 that allows for some vertical movement as the back bracket 300 and reflector 400 is elevated up or down by fine adjustment via a second cam 150. The second cam mount 124 for the second cam 150 is located on the second bracket 120 and passes through the opening 136 of the third bracket 130. This is shown in the respective side, top and front views of FIGS. 9A-9C. The final elevation tuning can be secured in place by a nut or similar component. The opening 136 is sized to allow for movement for rough and fine elevation adjustments. Slot 134 also allows for some adjustment of the back bracket 300 and the reflector 400.

The third bracket 130 attaches to the back bracket 300. In some cases, both the second bracket 120 and the third bracket 130 are used to attach the antenna mount 100 to the back bracket 300, even though the third bracket 130 slides in relation to the second bracket 120 via the second cam. The rivets 133 and 127 allow for such movement. In other cases, only the third bracket 130 is attached to the back bracket 300. The reflector and any reflector support may be integrated into one steel stamping. The back bracket 300 may be one steel stamping to be integrated with the second 120 and/or third bracket 130 of the antenna mount 100. The integrated components may be pre-assembled as part of an assembly of the antenna mount, which may be referred to as an Az/El assembly.

Figure 10:
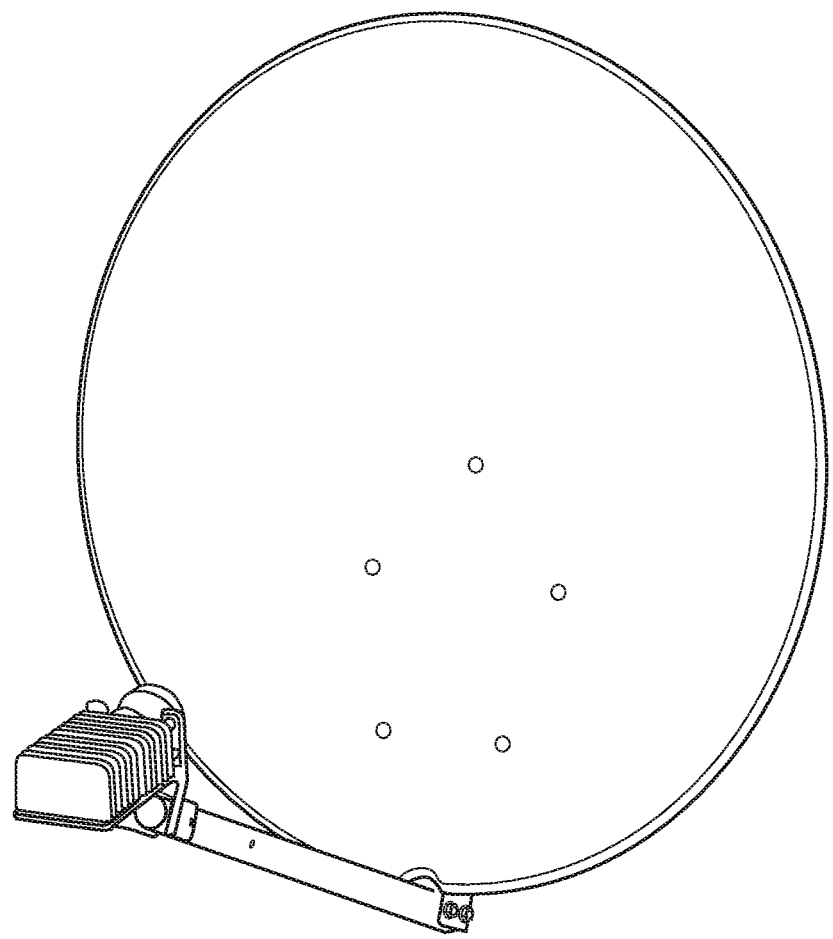
FIG. 10 is a perspective view of the embodiment of the satellite antenna showing a boom arm and a transceiver bracket.
Figure 11:
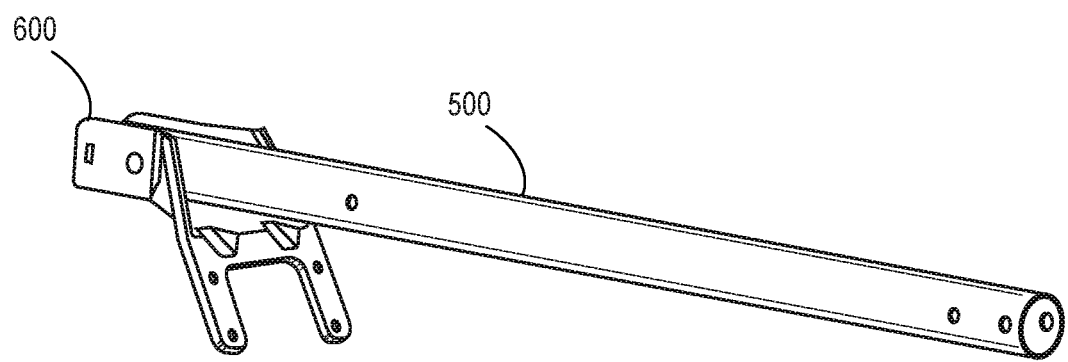
FIG. 11 is a perspective view of the embodiment showing the boom arm and the transceiver bracket in a shipping position.
Figure 12:
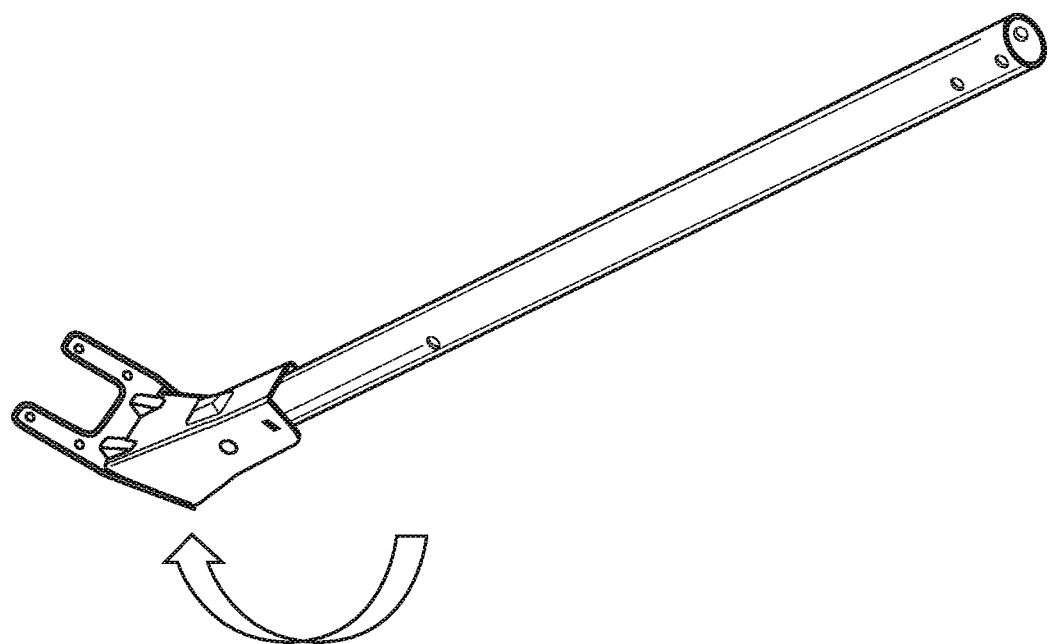
FIG. 12 is a perspective view of the embodiment showing the boom arm and the transceiver bracket when it is flipped out.

FIG. 10 shows an embodiment of the satellite antenna. FIGS. 11 and 12 show the boom arm 500 from the factory with the transceiver bracket 600 fold down against the book arm for shipping. The transceiver bracket is a stamped design that is attached to the boom arm by a pivot fixture or rivet. Upon installation, the transceiver bracket 600 folds out and snaps in place, such that the transceiver 700 will be positioned in the right place with respect to the reflector 400. No tool assembly may be required for these components, other than to attach the transceiver 700 to the transceiver bracket 600.

Figure 13:
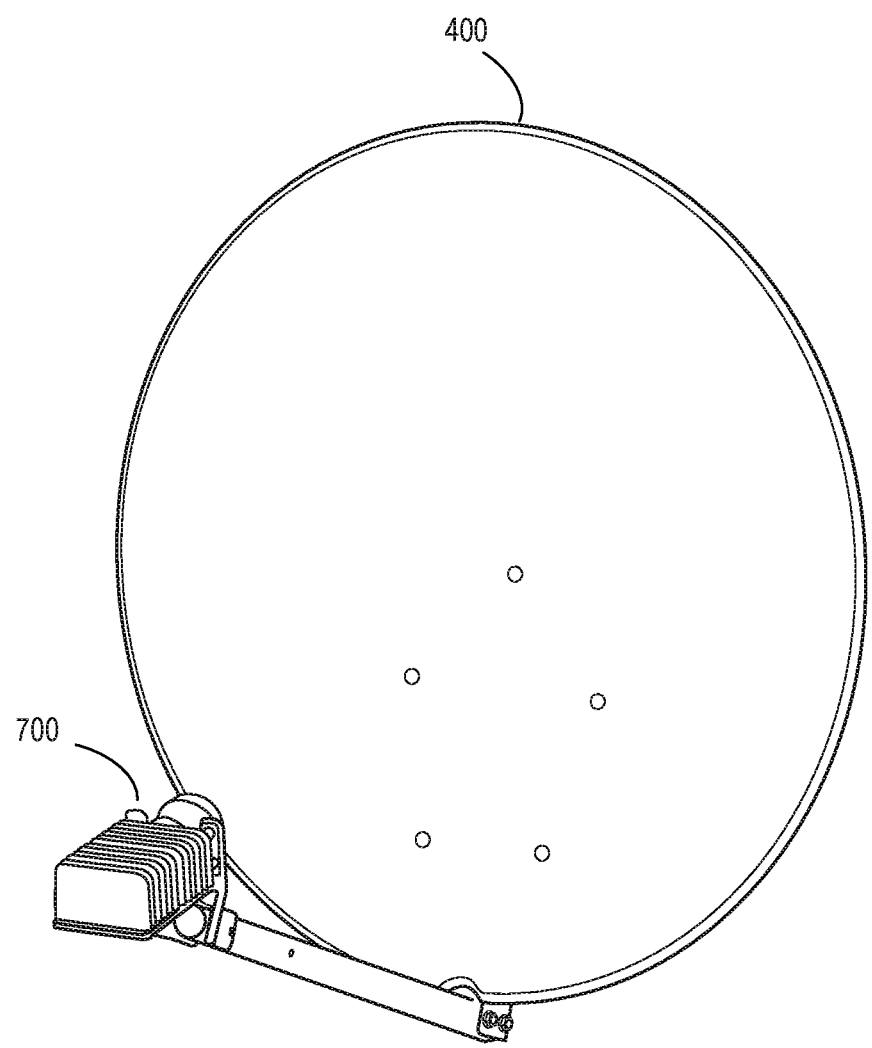
FIG. 13 is a perspective view of the embodiment of the satellite antenna identifying the transceiver and reflector.
Figure 14:
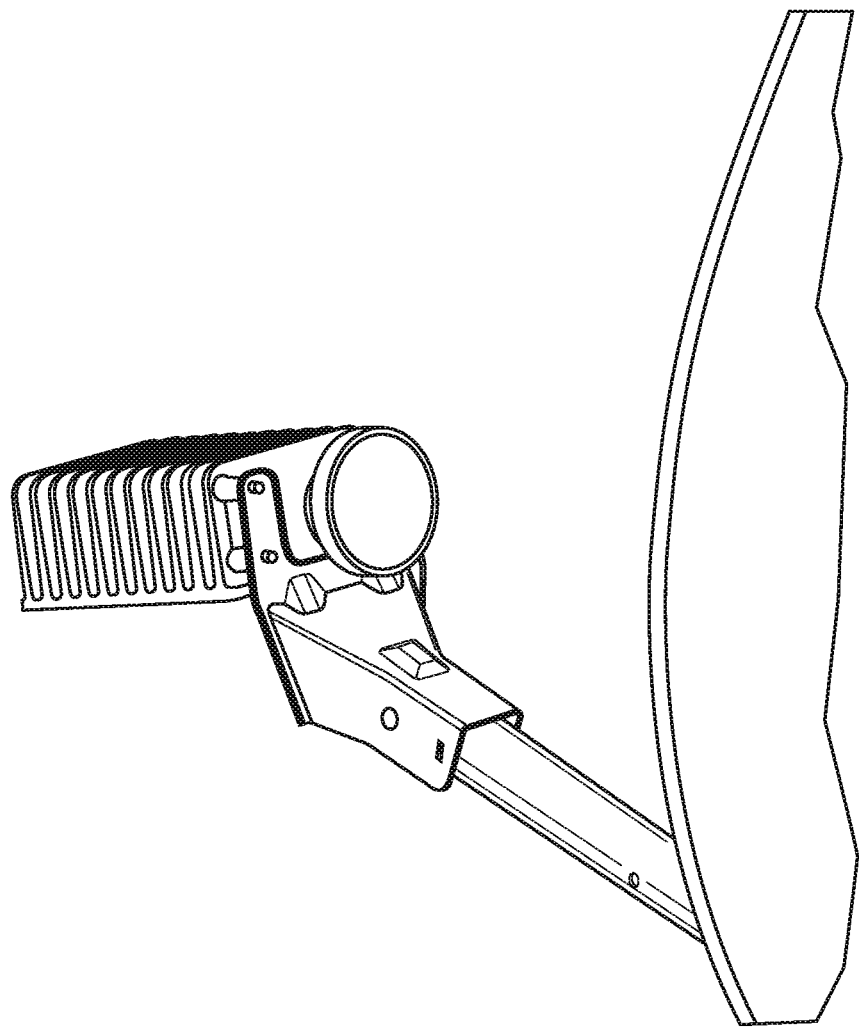
FIG. 14 is another perspective view of the embodiment showing the boom arm and the transceiver bracket.
Figure 15:
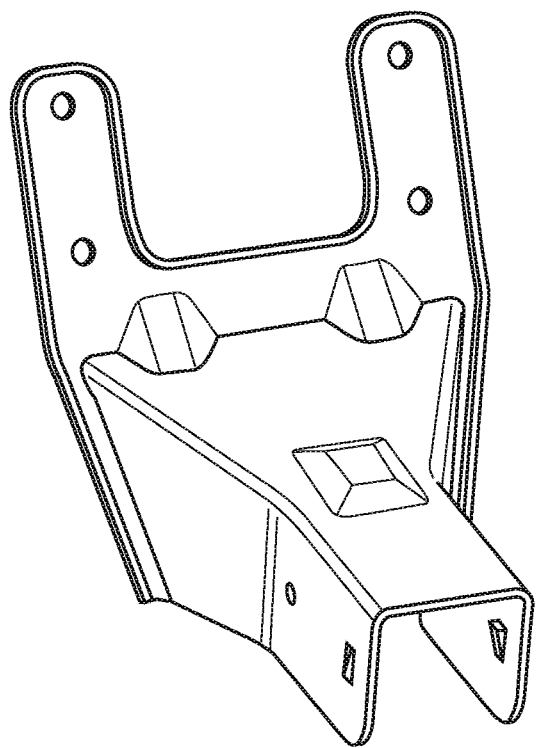
FIG. 15 is a perspective view of the transceiver bracket, according to some embodiments.

The transceiver bracket 600 may be easily replaced with any stamped bracket necessary to fit the transceiver 700, depending on the vendor, country, etc. In some cases, the reflector 400 and the transceiver bracket 600 may be designed for multiple transceivers. FIGS. 13-14 show views of the satellite antenna. FIG. 15 shows a close-up view of the transceiver bracket 600.

In some cases, all components are stamped parts and can be manufactured in the same factory with stamping capability. These components include the reflector 400, back bracket 300, portions or brackets of the Az/El assembly of the antenna mount 100 and transceiver bracket 600. Some solutions may be scaled to any size antenna from 40 cm up to 1.2 m in size.

In some embodiments, the first and second cams 140 and 150 are exposed. They may be lower than a top portion of the canister 200. The assembly of the antenna mount 100 is designed to involve less material and is located for the most part between the canister 200 and the back bracket 300. In some embodiments, none of the brackets of the assembly are located above a top level of the canister 200.

Figure 16A:
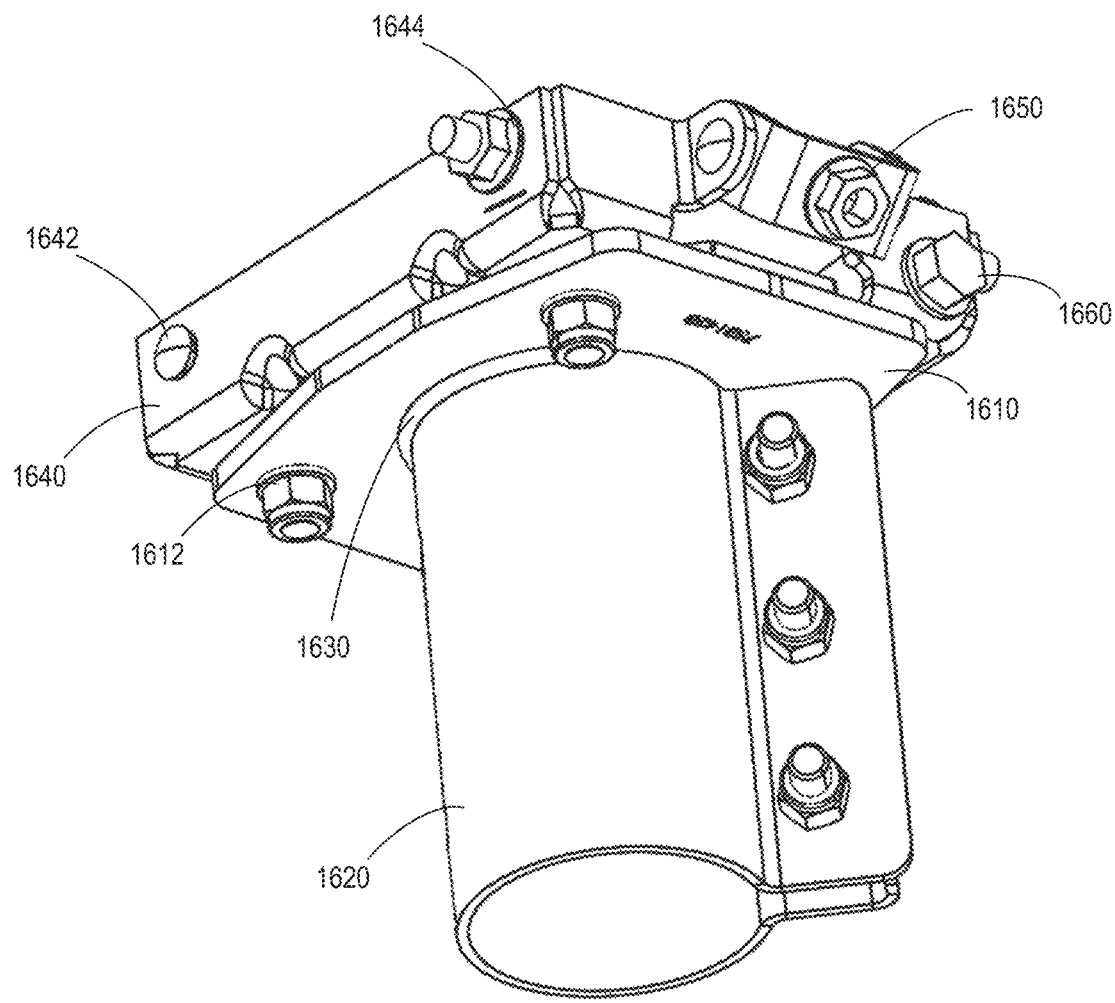
FIG. 16A is a perspective view of another embodiment of the antenna mount.

FIG. 16A illustrates another embodiment of an antenna mount, where the pole canister 1620 is coupled to a face of the first bracket 1610. In some cases, this coupling may be fixed. For example, the pole canister 1620 and the first bracket 1610 may be welded together with weld 1630.

In other embodiments, the first bracket 1610 and the pole canister 1620 are portions integrally formed as one component. In such cases, the first bracket portion 1610 and the pole canister portion 1620 are together a single, stamped component. In other cases, the first bracket portion 1610 and the pole canister portion 1620 are formed together in the same mold or molds, such that they become a single, molded component.

The second bracket 1640 is movably coupled to the first bracket 1610 at one or more pivots 1612 and adapted to pivot the second bracket 1640 in relation to the first bracket 1610 along a horizontal axis. The pole canister 1620 may be integrally formed with the first bracket 1610. For example, the first bracket 1610 and the pole canister 1620 may be a single, stamped component or a single, molded component.

Figure 16B:
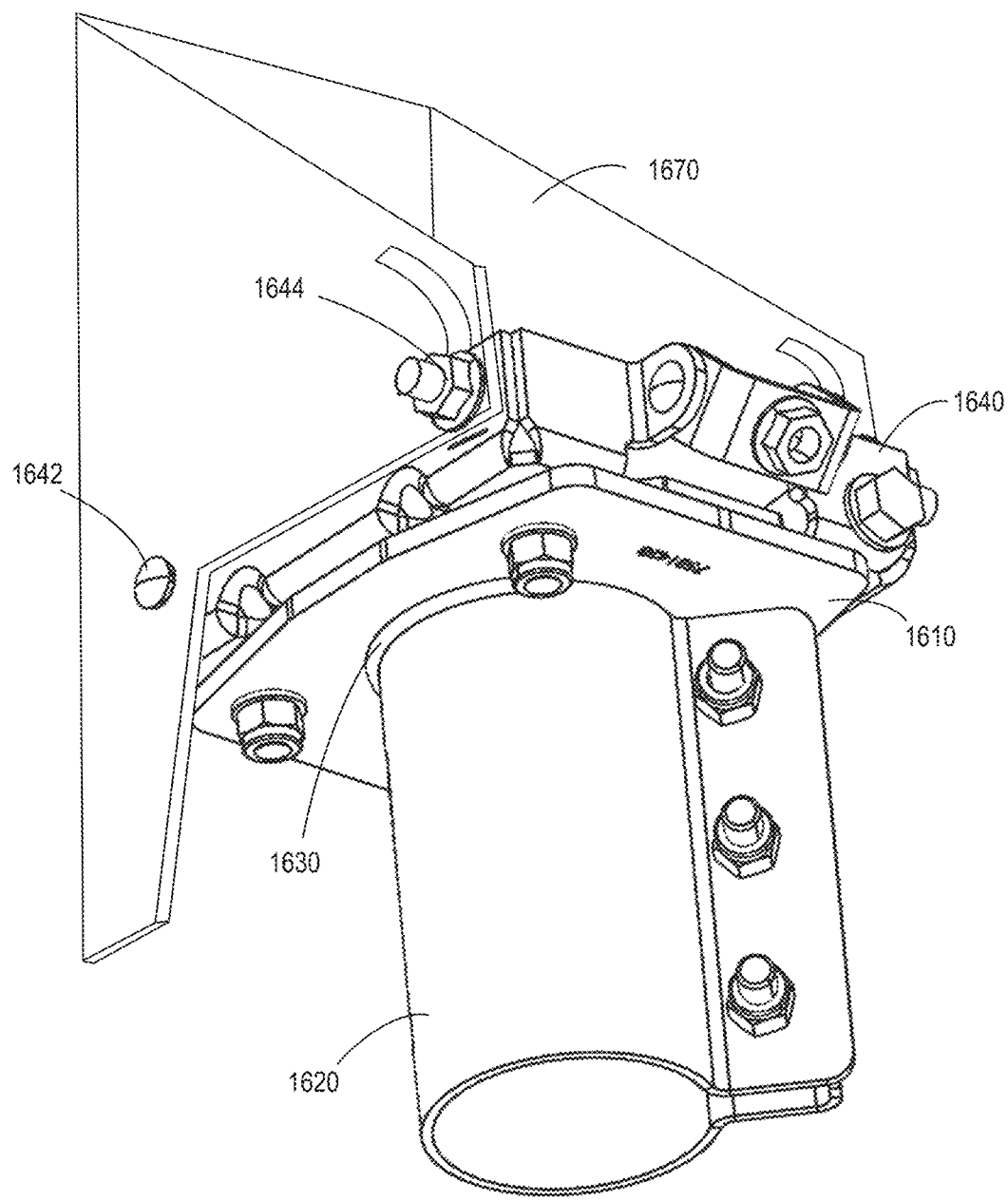
FIG. 16B is a perspective view of the embodiment in FIG. 16A, showing the back bracket.
Figure 16C:
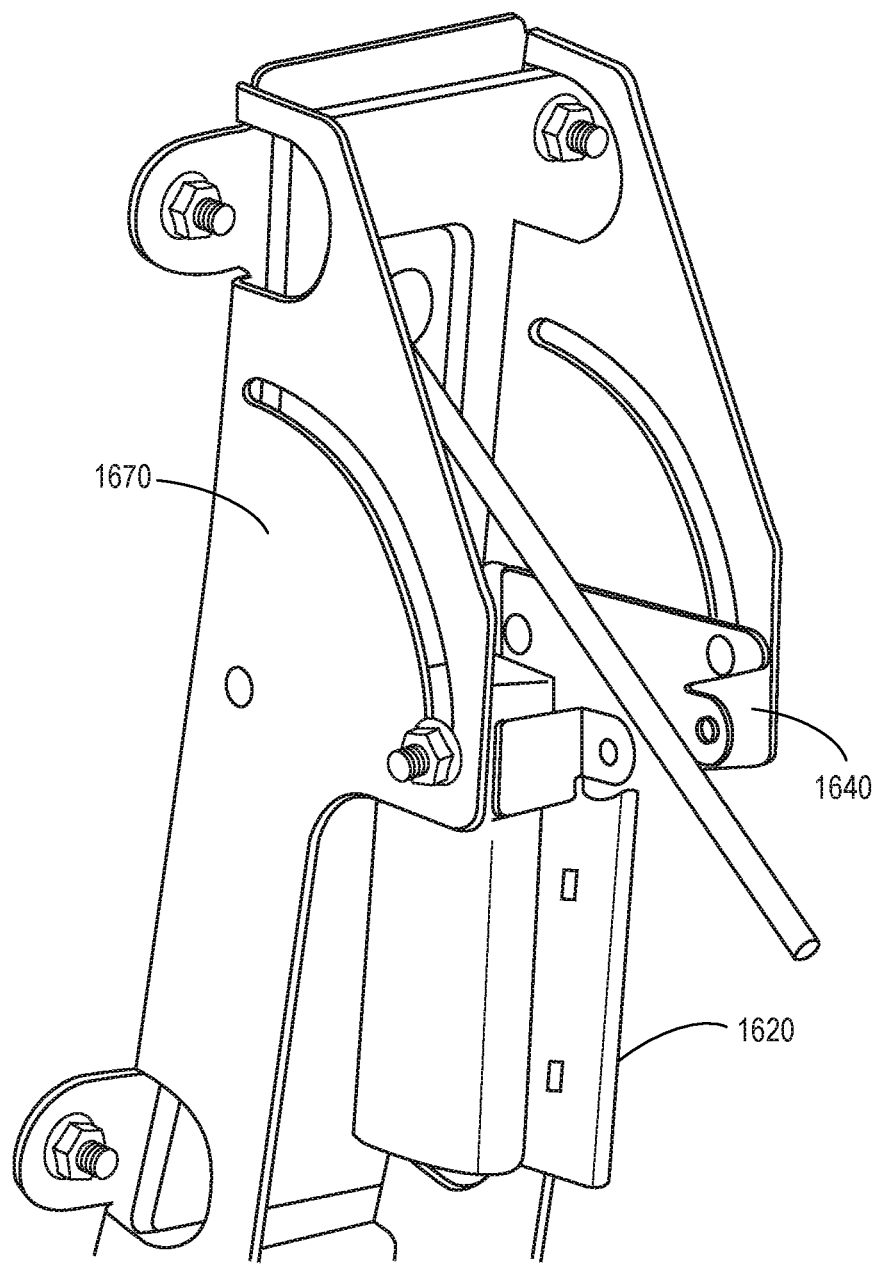
FIG. 16C is another perspective view of the embodiment shown in FIG. 16B.

The second bracket 1640 may also include an elevation lock 1650 configured to secure an elevation of the reflector and a fine azimuth tuner 1660 configured to finely tune an azimuth setting for the reflector. Pivot point(s) 1642 and attachment point(s) 1644 are used to moveably couple a back bracket and allow it to slide or rotate in a vertical or azimuth direction. The reflector will attach to the back bracket. FIG. 16B shows the back bracket 1670 of the embodiment. FIG. 16C is another view of this embodiment of the antenna mount.

Figure 17:
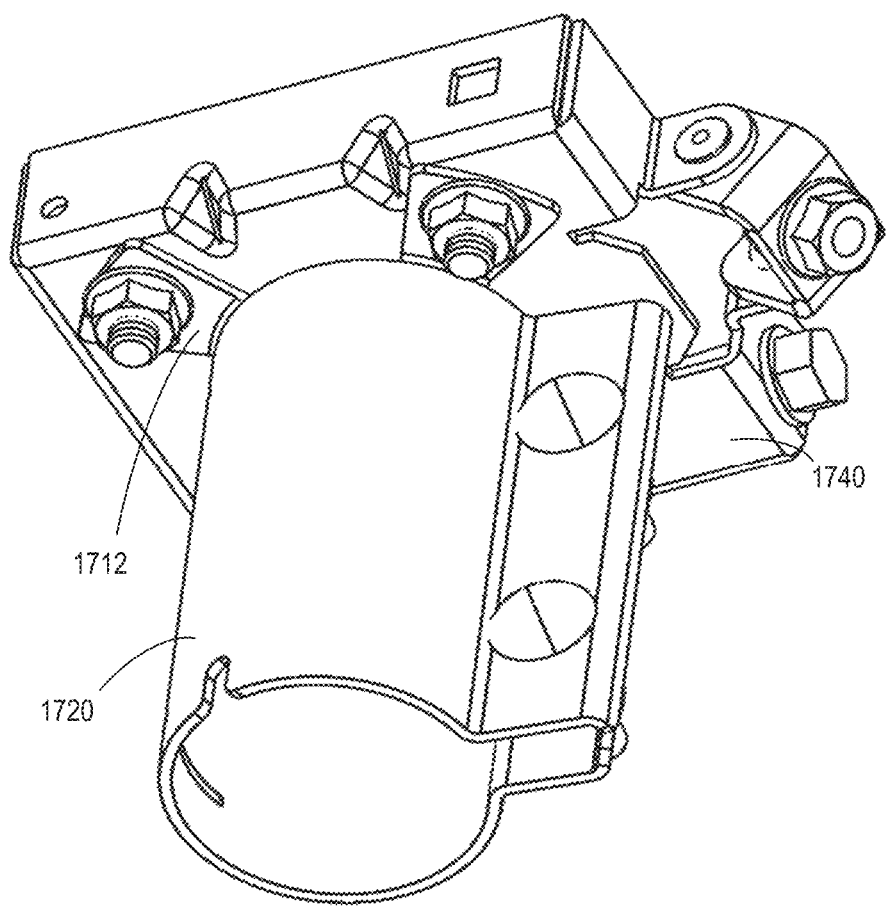
FIG. 17 is a perspective view of yet another embodiment of the antenna mount.

FIG. 17 illustrates another embodiment of the antenna mount. In this embodiment, the pole canister 1720 comprises one or more mounts 1712 adapted to couple the pole canister 1720 to the first bracket 1740. The first bracket 1740 is movably coupled to the pole canister 1720 via the one or more mounts 1712, such that the first bracket 1740 can rotate or shift in a horizontal direction. To provide a better view, the back bracket 1670 that is movably coupled to the first bracket 1740 is not shown in FIG. 17.

In this example, the mounts 1712 are tabs, each tab having at least one mounting aperture (e.g., enclosed hole, open hole or slot). The apertures of the mounts 1712 allow for adjustments and movements in the horizontal direction. The tabs may also extend from an end of the pole canister 1720 such that the end of the pole canister 1720 and flat surfaces of the tabs are in contact (e.g., flush) with the first bracket 1740 when coupled to the first bracket 1740. The tabs here are movably coupled to the first bracket 1740 by use of nuts and bolts.

These tabs are meant to be a non-limiting example of the mounts 1712. The mounts 1712 may be other shapes, rings, strips, brackets or other extensions from the end (i.e., very end or approximate the very end) of the pole canister. However, in various embodiments the mounts 1712 are integrally formed with the pole canister 1720 so that the mounts 1712 and the pole canister 1720 are one piece to be coupled to the first bracket 1740 via the mounts 1712. This avoids the need to have welding facilities at the site of manufacture or assembly. In some cases, the mounts 1712 and the pole canister 1720 are a single, stamped component. In other cases, the mounts 1712 and the pole canister 1720 are a single, molded component.

In some cases, the brackets in the embodiments of FIGS. 16A, 16B, 16C and 17 may be movably coupled, adjusted and secured to one another by means of cams, similar to what was described above for the embodiments shown in FIGS. 5-9C.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An antenna mount, comprising:
  a first bracket comprising a pole canister extending from a horizontal face of the first bracket and adapted to receive a pole along a vertical axis;
  a second bracket movably coupled to the first bracket at one or more pivots and adapted to pivot the second bracket in relation to the first bracket in an azimuth direction along a horizontal plane; and
  a back bracket movably coupled to the second bracket at a pivot and adapted to attach to a reflector, wherein the back bracket is adapted to slide or rotate along a vertical plane in relation to the second bracket to adjust an elevation of the reflector.

2. The antenna mount of claim 1, wherein the pole canister is integrally formed with the first bracket.

3. The antenna mount of claim 2, wherein the first bracket that comprises the pole canister is a single, stamped component.

4. The antenna mount of claim 2, wherein the first bracket that comprises the pole canister is a single, molded component.

5. The antenna mount of claim 1, wherein the second bracket comprises an elevation lock configured to secure the elevation of the reflector and a fine azimuth tuner configured to finely tune an azimuth setting for the reflector.

6. An antenna mount, comprising:
   a first bracket;
   a pole canister adapted to receive a pole along a vertical axis at the bottom end of the pole canister, wherein the pole canister further comprises one or more mounts adapted to couple the pole canister to the first bracket at the top end of the pole canister, wherein the one or more mounts extend out from the pole canister with horizontal faces, and wherein the first bracket is movably coupled to the pole canister at the one or more mounts and adapted to pivot the first bracket in relation to the pole canister in an azimuth direction along a horizontal plane; and
   a back bracket coupled to the first bracket at one or more pivots and adapted to attach to a reflector, wherein the back bracket is adapted to slide or rotate along a vertical plane in relation to the first bracket to adjust an elevation of the reflector.

7. The antenna mount of claim 6, wherein the one or more mounts comprise one or more tabs, each tab having at least one mounting aperture.

8. The antenna mount of claim 6, wherein the one or more mounts are integrally formed with the pole canister.

9. The antenna mount of claim 8, wherein the one or more mounts and the pole canister are a single, stamped component.

10. The antenna mount of claim 8, wherein the one or more mounts and the pole canister are a single, molded component.

11. The antenna mount of claim 6, wherein the one or more mounts extend from an end of the pole canister such that the end of the pole canister and surfaces of the one or more mounts are in contact with the first bracket when coupled to the first bracket.

12. The antenna mount of claim 6, further comprising a boom arm coupled to the back bracket at a first end and adapted to position a transceiver at a second end to point towards the reflector.

13. The antenna mount of claim 6, further comprising a stamped bracket coupled to the boom arm at a pivot located proximate to the second end of the boom arm, the stamped bracket adapted to rotate from a first position pointed along the boom arm towards the first end to a second position that is secured and adapted to attach an antenna transceiver.

14. The antenna mount of claim 13, further comprising the reflector, wherein the reflector is adapted to collect signals for a plurality of transceivers and wherein the stamped bracket is adapted to attach the plurality of transceivers.

* * * * *